United States Patent [19]

Ishikawa et al.

[11] Patent Number: 4,974,470
[45] Date of Patent: * Dec. 4, 1990

[54] TOOTH PROFILE OF ONE OF CIRCULAR SPLINES OF FLAT-SHAPED STRAIN WAVE GEARING

[75] Inventors: Shoichi Ishikawa, Yokohama; Yoshihide Kiyosawa, Hotaka, both of Japan

[73] Assignee: Harmonic Drive Systems Inc., Tokyo, Japan

[*] Notice: The portion of the term of this patent subsequent to Jul. 11, 2006 has been disclaimed.

[21] Appl. No.: 244,926

[22] Filed: Sep. 15, 1988

[30] Foreign Application Priority Data

Sep. 21, 1987 [JP] Japan ................. 62-236843

[51] Int. Cl.$^5$ ............................................. F16H 33/00
[52] U.S. Cl. ...................................................... 74/640
[58] Field of Search ............... 74/640, 461, 462, 464, 74/465

[56] References Cited

U.S. PATENT DOCUMENTS

| | | | |
|---|---|---|---|
| 1,682,563 | 8/1928 | Hill | 74/462 |
| 1,909,117 | 5/1933 | Pigott | 74/462 |
| 2,128,815 | 8/1938 | Guest | 74/462 |
| 2,285,910 | 6/1942 | De Buigne | 74/63 |
| 2,421,463 | 6/1947 | Noreyko | 74/462 |
| 2,849,897 | 9/1958 | Walma | 74/804 |
| 2,906,143 | 9/1959 | Musser | 74/640 |
| 2,929,266 | 3/1960 | Musser | 74/640 |
| 2,931,249 | 4/1960 | Musser | 74/640 |
| 2,932,986 | 4/1960 | Musser | 74/665 |
| 2,943,508 | 7/1960 | Musser | 74/424.8 |
| 2,954,205 | 9/1960 | Musser | 251/134 |
| 2,959,065 | 11/1960 | Musser | 74/438 |
| 2,960,884 | 11/1960 | Hill | 74/462 |
| 2,983,162 | 5/1961 | Musser | 74/640 |
| 3,001,840 | 9/1961 | Musser | 384/447 |
| 3,020,775 | 2/1962 | Musser | 74/440 |
| 3,039,324 | 6/1962 | Waterfield | 74/640 |
| 3,091,979 | 6/1963 | Schaefer et al. | 74/640 |

(List continued on next page.)

FOREIGN PATENT DOCUMENTS

| | | |
|---|---|---|
| 0113375 | 7/1984 | European Pat. Off. . |
| 0158751 | 10/1985 | European Pat. Off. . |
| 0266972 | 11/1988 | European Pat. Off. . |
| 1167147 | 4/1964 | Fed. Rep. of Germany . |
| 2533965 | 2/1976 | Fed. Rep. of Germany . |

OTHER PUBLICATIONS

Acta Technica Academiae Scientiarum Hungaricae (J. Peter) 94(1-2) pp. 63-72 (1982) (Geometric Conditions of Harmonic Drive).

Acta Technica Academiae Scientiarum Hungaricae (J. Peter) 94(1-2) pp.91-100 (1982) (Investigation of the Engagement of Harmonic Drives Part 1).

*Primary Examiner*—Dirk Wright
*Attorney, Agent, or Firm*—Frishauf, Holtz, Goodman & Woodward

[57] ABSTRACT

A strain wave gearing comprising a circular spline, flexspline inside the circular spline, a wave generator for deforming the flexspline into, for example, an ellipsoid and a motor for rotating the wave generator to produce a relative rotation between the flexspline and the circular spline. The strain wave gearing is sometimes termed a harmonic drive transmission, and there is a type of gearing called flat-shaped strain wave gearing which is composed of two circular splines juxtaposed with each other, a flexspline in the circular splines having the same number of teeth as the first circular spline, a wave generator for deforming the flexspline into an ellipsoid and a motor for rotating the wave generator. In the flat-shaped gearing, each tooth of the flexspline is provided with a convex tooth face and a concave tooth flank. The tooth profile of the first circular spline is given by such a locus curve that the tooth face of the flexspline plots when the deformed configuration of the flexspline is rotated by the wave generator, and the tooth depth of the first circular spline is made equal to or larger than the working depth of the flexspline. Thus, the teeth of the flexspline engage with those of the first circular spline in the broad extent of the engagement region.

3 Claims, 8 Drawing Sheets

U.S. PATENT DOCUMENTS

| | | | |
|---|---|---|---|
| 3,101,009 | 8/1963 | Musser et al. | 74/640 |
| 3,117,763 | 1/1964 | Musser | 251/165 |
| 3,147,640 | 9/1964 | Musser | 74/640 |
| 3,169,202 | 2/1965 | Proctor et al. | 310/83 |
| 3,172,299 | 3/1965 | Musser | 74/388 |
| 3,178,963 | 4/1965 | Musser | 74/640 |
| 3,180,172 | 4/1965 | Leggatt | 74/462 |
| 3,182,525 | 5/1965 | Tinder et al. | 74/640 |
| 3,196,713 | 7/1965 | Robinson | 74/640 |
| 3,415,143 | 12/1968 | Ishikawa et al. | 74/640 |
| 3,555,929 | 1/1971 | Hossfeld | 74/640 |
| 3,996,816 | 12/1976 | Brighton | 74/640 |
| 4,051,745 | 10/1977 | Ishikawa | 74/462 |
| 4,140,026 | 2/1979 | Rouverol | 74/462 X |
| 4,149,431 | 4/1979 | Rouverol | 74/462 |
| 4,601,216 | 7/1986 | Inoue et al. | 74/640 |
| 4,703,670 | 11/1987 | Kondo | 74/640 |
| 4,823,638 | 4/1989 | Ishikawa | 74/462 X |

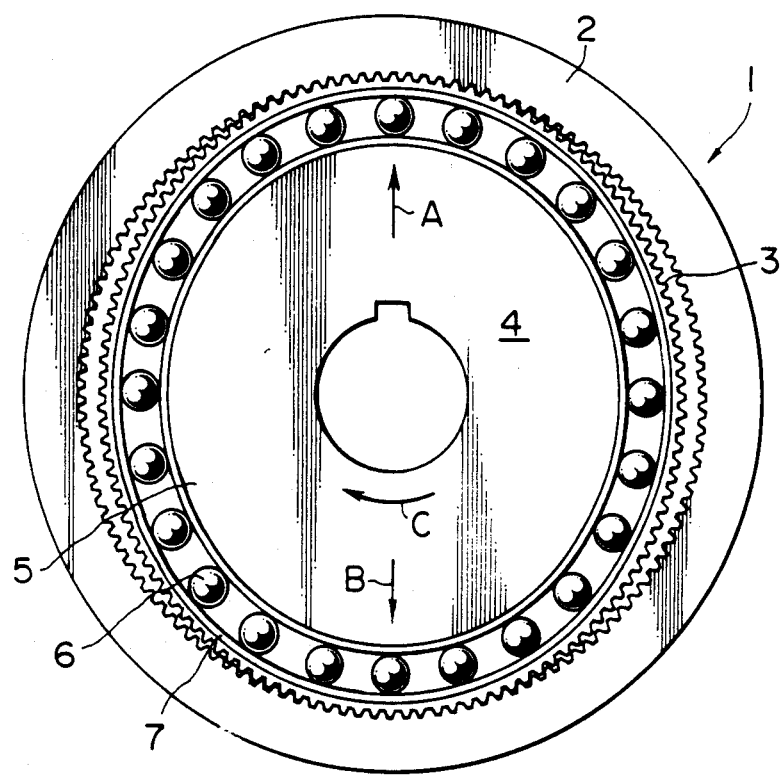
FIG. I
PRIOR ART

TOOTH PROFILE OF ONE OF CIRCULAR SPLINES OF FLAT-SHAPED STRAIN WAVE GEARING

CROSS REFERENCE OF RELATED APPLICATION

Hereby cross-referenced, and incorporated by reference, is the copending application of the same assignee, U.S. Ser. No. 114,119, now U.S. Pat. No. 4,823,638 entitled "Tooth Profile of Spline of Strain Wave Gearing" Filed Oct. 27, 1987 by the same S. Ishikawa (sole), now U.S. Pat. No. 4,823,628, issued Apr. 25, 1989.

BACKGROUND OF THE INVENTION

1. Field of the Invention

The present invention relates to a strain wave gearing, and more particularly to an improvement in tooth profile of a circular spline used in the strain wave gearing which comprises a first rigid circular spline, a second rigid circular spline juxtaposed with the first spline along the axis of the first spline and having a different number of teeth from that of the first spline, a flexspline coaxially disposed inside the two circular splines in engagement with the circular splines and having the same number of teeth as the first circular spline, and a wave generator for bending and deforming the flexspline to bring it into partial engagement with the respective teeth of both circular splines and for rotating the deformed configuration of the flexspline whereby the wave generator is rotated to produce a relative rotation between the first and second circular splines.

2. Description of Prior Art

The strain wave gearing is well known, as seen from U.S. Pat. No. 2,906,143 granted to Musser. A typical strain wave gearing comprises a rigid circular spline, a flexspline disposed inside the circular spline, the flexspline being deformable into, for example, an elliptic configuration to bring the flexspline into an engagement with the circular spline at two points and further having a number of teeth which is larger or smaller than that of the circular spline by 2 n ("n" being a positive integer), and a wave generator disposed in the flexspline to deform the flexspline to, for example, an elliptic configuration so as to bring the flexspline into engagement with the circular spline at the two points on the major axis of the ellipsoid. The wave generator includes an elliptic cam plate and a ball bearing fittingly mounted on the outer periphery of the cam plate. The outer race of the bearing is inserted into the flexspline to deform the flexspline to the elliptic shape. In the strain wave gearing as mentioned above, the input shaft fixed to the cam plate of the wave generator is rotated while the ellipsoid of the flexspline is rotated. Upon rotating the ellipsoid, one of the flexspline and the circular spline is rotated relative to the other by an amount that is in proportion to the difference in the number of teeth between the two splines. Where an output shaft is mounted on either the flexspline or the circular spline, the output shaft is rotated very slowly in comparison with the input shaft. Thus, the strain wave gearing has frequently been applied to precision machinery because in the gearing, a high reduction ratio is obtained in spite of a small number of elements used therefor.

Recent modifications have been made with respect to the teeth used in a strain wave gearing so as to improve the engagement characteristics of the teeth to obtain good performance and increase the load capacity. The basic gear tooth is disclosed in detail in U.S. Pat. No. 3,415,143 granted to Ishikawa. The Ishikawa patent teaches that an involute tooth shape is applied to the gearing. Thus, the elliptic flexspline is engaged with the circular spline only at the two points out of the major axis of the ellipsoid, resulting in lowering the allowable transfer torque.

If the tooth of the Ishikawa patent is applied to the strain wave gearing, however, it is difficult to bring the flexspline into a continuous engagement with the circular spline until the tooth of one of the splines is completely separated from that of the other. More specifically, in the case of a zero or negative deviation as shown in the curves a and c of FIG. 4 of the Ishikawa patent, the flexspline engaging with the rigid circular spline has a movement locus of the typical point of the tooth thereof (except for a small portion of the top of the curve c), the locus being concave with respect to the circular spline. In order to obtain continuous contact between both splines, it is necessary that the profile of the tooth of the circular spline must be formed convex in shape, unlike the linear tooth and the involute tooth. Where the movement locus of the typical point of the flexspline is convex (positive deviation) as shown in the curve b of FIG. 4 of the Ishikawa patent, deflection of the flexspline increases and then the bending stress increases. Thus, it is disadvantageous in that the available range of the locus is small and that there are few teeth which are in mesh with each other. There is room for improving the strain wave gearings of the Ishikawa patent with regard to allowable transfer torque.

To this end, one of the inventors, Ishikawa, has made an improvement of the strain wave gearing, as shown in the above-mentioned U.S. Pat. No. 4,823,638. In the improved strain wave gearing, the tooth faces of both the circular spline and the flexspline are formed with a convex profile while the tooth flanks thereof are formed with a concave profile, so that the continuous engagement or contact is effected by meshing the convex-shaped tooth face of one of the splines with the convex-shaped tooth face of the other spline. The strain wave gearing as mentioned above has successfully operated for a so-called cup-shaped strain wave gearing including a single rigid circular spline and a cup-shaped flexspline having the different number of teeth from the circular spline.

Meanwhile, separately from the cup-shaped gearing mentioned above, there is a type of strain wave gearing called flat-shaped strain wave gearing. The flat-shaped gearing is composed of a first rigid circular spline, a second rigid circular spline juxtaposed with the first spline along the axis of the first spline and having a different number of teeth from the first spline, a flexspline coaxially disposed inside the two circular splines in engagement with both circular splines and having the same number of teeth as the first circular spline, and a wave generator for bending and deforming the flexspline to bring the flexspline into partial engagement with the respective teeth of both circular splines and for rotating the deformed configuration of the flexspline whereby the wave generator is rotated to produce a relative rotation between the first and second splines. The reason why this strain wave gearing is called flat shaped strain wave gearing is that two circular splines are juxtaposed with each other and a flexspline formed with an annular configuration whereby the whole of the gearing is made in a thin, flat configuration.

In the flat shaped strain wave gearing, the tooth profile of the above-mentioned U.S. Pat. No. 4,823,638 can be applied to the engagement portion between the second circular spline and the flexspline having the different number of teeth to obtain the continuous engagement of the teeth therebetween. On the other hand, the same tooth profile as disclosed in the above-mentioned U.S. Pat. No. 4,823,638 cannot be applied to the engagement between the first circular spline and the flexspline having the same number of teeth because there is no relative rotation between the splines whereby a tooth of the flexspline is moved only within a space of the first circular spline.

Study has already been made on the engagement between the first circular spline and the flexspline as shown, for example, in U.S. Pat. No. 2,959,065 granted to Musser. The strain wave gearing of the Musser patent is so constructed that the first circular spline is meshed with the flexspline at specific points apart from the major axis of an elliptic wave generator. In other words, only the limited teeth are effectively engaged with each other in the whole of the gearing. Thus, it is disadvantageous in that the torque transfer amount is limited and the capacity of the torque transfer decreases.

SUMMARY OF THE INVENTION

It is, therefore, an object of the invention to provide a novel flat-shaped strain wave gearing in which the spline is brought into continuous contact with one of the circular splines juxtaposed with each other, i.e. the first circular spline, over a wide extent in their meshing region.

It is another object of the invention to provide a strain wave gearing having a torque transfer capacity higher than the conventional gearing.

It is a further object of the invention to provide a strain wave gearing which can be simply and easily manufactured.

To achieve these objects, the present invention provides a strain wave gearing comprising a first rigid circular spline, a second rigid circular spline juxtaposed with the first spline along the axis of the first spline and having a different number of teeth from that of the first spline, a flexspline disposed coaxially inside the two circular splines to engage with both splines and having the same number of teeth as the first circular spline, and a wave generator having a non-circular configuration for deforming the flexspline into such non-circular configuration to bring the flexspline into partial engagement with the teeth of each of the first and second circular splines and for rotating the deformed configuration of the flexspline to produce a relative rotation between the first and second circular splines. A feature of the invention resides in each of the second circular spline and the flexspline having a tooth profile formed based on a mapping curve which is a similar figure of a reduced scale of one-half applied to a first locus curve of the flexspline movement relative to the second circular spline in accordance with said configuration of the wave generator, with the similar figure being based on a reference point where the second circular spline and the flexspline are transferred from a contact state to a disengagement state from each other so as to provide each tooth of the flexspline with a convex tooth face and a concave tooth flank, wherein the tooth profile of the first circular spline other than a free space at the bottom of the tooth is given by a second locus curve that the tooth face of one tooth of the flexspline plots in one tooth space of the first circular spline when the deformed configuration of the flexspline is rotated by the wave generator, and the tooth depth of the first circular spline is made equal to or larger than that of the flexspline.

The foregoing and other features of the invention will be described in detail in connection with an illustrated embodiment and with reference to the accompanying drawings.

BRIEF DESCRIPTION OF THE DRAWINGS

FIG. 1 is a front view of a conventional strain wave gearing;

DESCRIPTION OF THE PREFFERRED EMBODIMENT

Figure 2A:
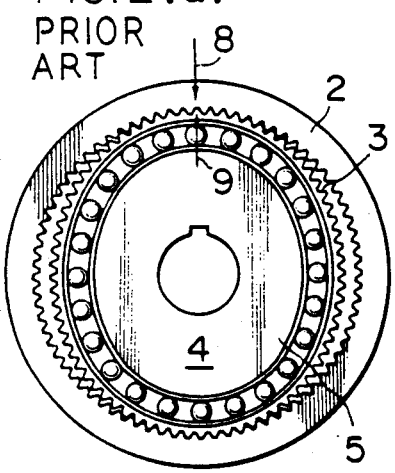
FIGS. 2(a)–2(d) illustrate the operation of the strain wave gearing of FIG. 1.

Referring to the drawings, particularly to FIG. 1, there is shown a typical strain wave gearing 1. Before discussing the present invention, the principle of the strain wave gearing 1 is described with reference to FIG. 1 as well as FIGS. 2(a)–(d) which illustrate the operation of the gearing.

The strain wave gearing 1 comprises a rigid circular spline 2, a flexible flexspline 3 disposed inside the circular spline 2, and a wave generator 4 of an elliptic configuration which fits in the flexspline 3 to deform the flexspline into an ellipsoid. The wave generator 4 includes an inner cam plate 5 of an elliptic profile and a flexible ball bearing 6 fittingly mounted on the periphery or the cam plate 5 to deform the bearing into an ellipsoid. The bearing 6 has an outer race 7 which fits in the flexspline 3. The flexspline is deformed into an ellipsoid by the wave generator 4 so that the flexspline is engaged with the circular spline 2 at two points on the major axis of the ellipsoid and the adjacent regions thereof. In FIG. 1, the engagement points are illustrated as two points shown by arrows A and B. By virtue of the ball-bearing 6 of the wave generator 4, the ellipsoid of the flexspline 3 is rotated when the cam plate 5 is rotated, but the flexspline 3 is not directly rotated by the plate. In this embodiment, the flexspline 2 has a number of teeth which is less than that of the circular spline 2 by 2n ("n" being a positive integer), for example 4.

Figure 2B:
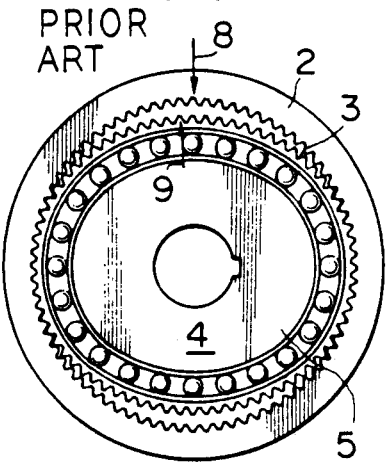
Figure 2C:
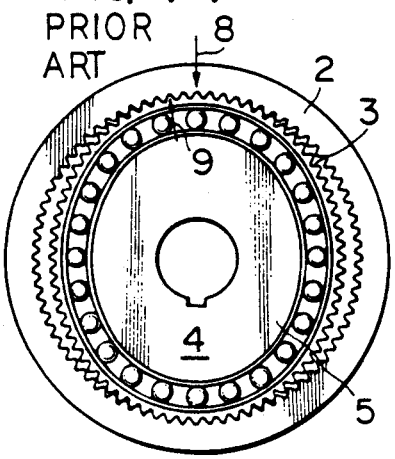
Figure 2D:
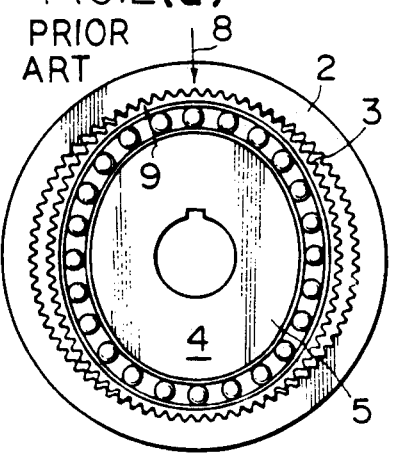

The operation of the strain wave gearing 1 will now be described with reference to FIGS. 2(a)–(b). When the cam plate 5 of the wave generator 4 is placed at the position shown in FIG. 2(a), one tooth space 8 of the circular spline 2 is engaged with one tooth 9 of the flexspline 3 on the major axis of the elliptic flexspline. (In fact, some teeth are also engaged with each other in the regions adjacent to the space 8 and the tooth 9.) Upon rotating the cam plate 5 by 90 degrees as shown in FIG. 2(b), the ellipsoid of the flexspline 3 is rotated so that the engagement points are shifted to disengage the tooth 9 from the space 8 when the major axis of the ellipsoid is shifted. As shown in FIG. 2(c), when the cam plate 5 is further rotated, the space 8 is again engaged with the tooth 9 at a position that is shifted by one-half of the difference (4 teeth) in the number of teeth, i.e. by n teeth (2 teeth). As shown in FIG. 2(d), when the cam plate 5 has been rotated by 360 degrees, the space 8 is shifted relative to the tooth 9 by an amount which is the difference in the number of teeth (i.e. 4 teeth). If sequential shifting of the engagement points are outputted, a great reduction ratio can be obtained.

One known type of strain wave gearing is cup-shaped strain wave gearing. This gearing has a cup-shaped flexspline which extends in a direction normal to the sheet surface of FIG. 1 and one of the ends is closed to form a cup shape. It is advantageous in that the cup-shaped gearing is simple in its construction. Since the flexspline is made in a cup shape, however, it is disadvantageous in that the overall size of the gearing becomes larger and thus occupies more spaces.

Figure 3:
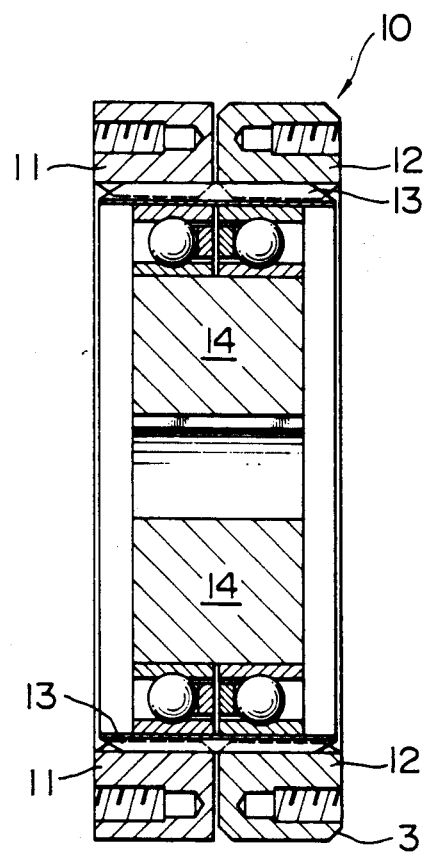
FIG. 3 is a sectional view of a conventional flat-shaped strain wave gearing.

In order to overcome the disadvantage, another strain wave gearing has been developed as shown in FIG. 3. The gearing 10 comprises a first rigid circular spline 11, a second rigid circular spline 12 juxtaposed with the first spline along the axis of the first spline and having a different number of teeth from that of the first spline, a flexspline 13 disposed coaxially inside both circular splines and having the same number of teeth as the first circular spline and a wave generator 14 for deforming the flexspline into a non-circular configuration to bring the flexspline into partial engagement with the teeth of each of the first and second circular splines and for rotating the deformed configuration of the flexspline to produce a relative rotation between the first and second circular splines. The strain wave gearing 10 is made thin and flat as a whole because the annular or circular splines 11 and 12 are juxtaposed with each other and the flexspline is made in a circular shape rather than a cup shape, as shown in FIG. 3. Thus, this gearing is referred to as "a flat-shaped strain wave gearing".

In the flat-shaped gearing, the wave generator 14 also deforms the flexspline 13 into, for example, an ellipsoid and rotates the deformed configuration of the flexspline. By the rotation of the wave generator 14 as shown in FIGS. 2(a)–(d), engagement points of the flexspline 13 and the first circular spline 11, and the flexspline 13 and the second circular spline 12 are also rotated. As mentioned above, the number of teeth of the flexspline 13 is equal to that of the first circular spline 11. Therefore, even if the configuration of the flexspline is rotated, there is no relative rotation between the flexspline 13 and the first circular spline 11. As the number of teeth of the flexspline 13 is different from that of the second circular spline 12, however, the splines 11 and 12 are rotated relative to each other as explained with referece to FIGS. 2(a)–(d). As a result, the first circular spline 11 is rotated relative to the second circular spline 12. Thus, in the case where an input shaft is mounted on the wave generator, one of the circular splines is fixed stationarily and an output shaft is attached to the other circular spline, a great reduction ratio can be obtained between the input and output shafts.

In the so-called cup-shaped strain wave gearing and the above-mentioned flat-shaped strain wave gearing, it is desirable for the engagement region between the circular spline and the flexspline to become wider or greater since the torque transfer capacity becomes higher. One of the inventors has already proposed a novel cup-shaped strain wave gearing, as shown in above-mentioned U.S. Pat. No. 4,823,638 which is cross-referenced herein, so as to expand the engagement region of the splines by providing the tooth profiles of the circular spline and the flexspline with a convex shape at their tooth faces and a concave shape at their tooth flanks. Thus, the two splines are continuously engaged with each other at the convex-shaped tooth faces, so that in the cup-shaped strain wave gearing, the extent of spline engagement is expanded. As explained in the above-mentioned U.S. Pat. No. 4,823,638 in detail, the tooth profile of the spline is defined by a mapping curve which is a similar figure of a reduced scale of ½ applied to a movement locus of the flexspline to the circular spline in accordance with the configuration of the wave generator, the similar figure being based on a reference point where the splines are separated from each other.

Figure 4:
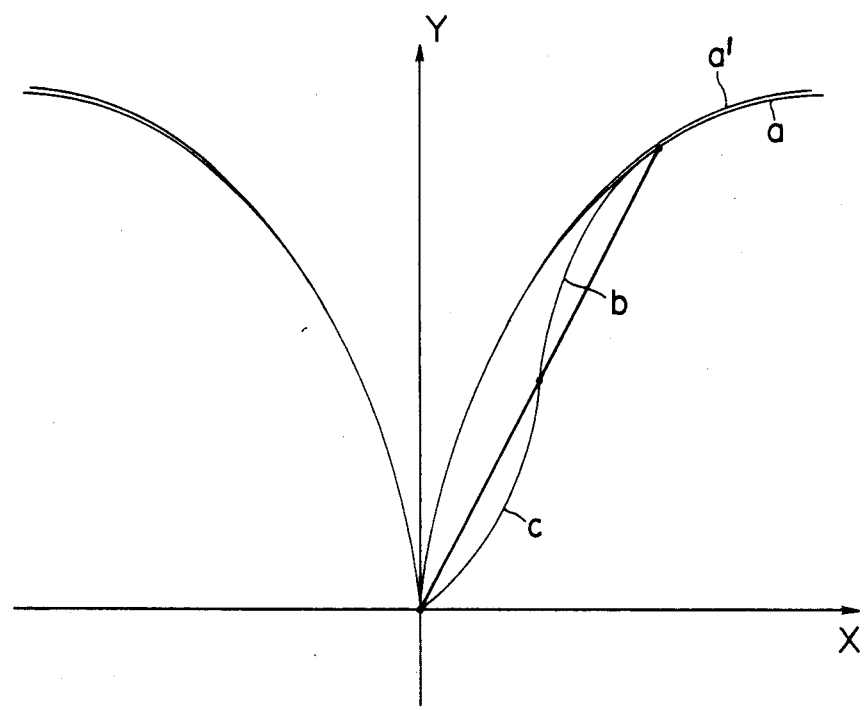
FIG. 4 shows the extent of an approximation arrived at by means of a rack-tooth approximating method with respect to a movement locus of the flexspline in the circular spline of cup-shaped strain wave gearing or in the second circular spline of a flat-shaped strain wave gearing.

In summary, the engagement between the flexspline and the circular spline is deemed to be an approximation to that of a rack mechanism. A locus of movement of the flexspline to the circular spline is obtained from a wave generator used in the strain wave gearing. A mapping curve is produced from the movement locus of the flexspline by a similar figure of a reduced scale of ½. The curve is used as a profile for the tooth face of the circular spline and of the flexspline. The approximation is in such a range that errors are allowable because the splines of the strain wave gearing have at least one hundred teeth, and generally more than 160 teeth. FIG. 4 shows an example of the degree of the approximation. In FIG. 4, the reference character a designates a movement locus of a rack mechanism, and the reference character a' indicates a movement locus of the spline. In FIG. 4, the reference characters b and c show examples of the tooth faces of the circular spline and the flexspline. Meanwhile, in FIG. 4, the curve a illustrates a movement locus having no deviation, wherein the coordinates X and Y are given by the following formulas.

$$X = \tfrac{1}{2}m(2\phi - \sin 2\phi)$$

$$Y = m(1\phi - \cos 2\phi)$$

Here, $\phi$ is a parameter and m is a module of the tooth.

Figure 5:
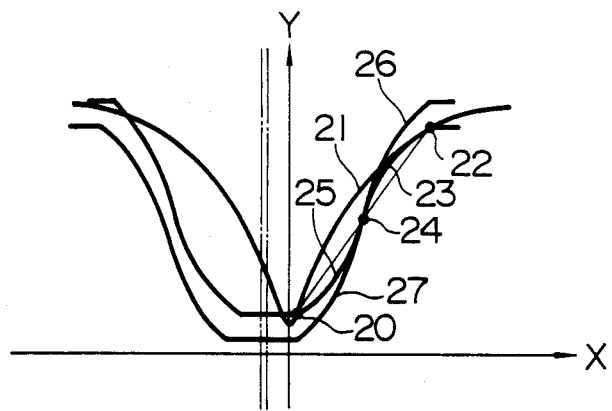
FIG. 5 shows one example of tooth profile that enables the flexspline to be brought into continuous contact with the circular spline of the cup-shaped strain wave gearing or the second circular spline of the flat-shaped strain wave gearing.

FIG. 5 shows how the curves of the tooth profiles mentioned above are obtained. In FIG. 5, the point 20 designates a tooth crest of the flexspline, and the curve 21 shows a movement locus of the crest 20 which is defined by the wave generator, in particular, the configuration of the cam plate thereof. The point 22 shows the limit of the contact between the two splines or the outermost point of their contact (i.e. the outermost engagement position apart from the center of the engagement). The curve 23 is the tooth face of the circular spline. The curve 23 is a mapping curve obtained by a similar figure with a reduced scale of ½ applied to the portion of the curve 21 between the points 20 and 22, with the reference point being the contact limit 22. The point 24 is obtained by the transformation from the point 20. The curve 25 between the points 24 and 20 is obtained by rotating the curve 23 about the point 24 by 180 degrees, and the curve 25 shows a profile for the tooth face of the flexspline. The curve 26 shows a profile for the tooth flank of the flexspline and curve 27 shows a profile for the tooth flank of the circular spline.

The profile of the tooth faces of the circular spline and of the flexspline as shown in FIG. 5 are obtained by assuming that both splines are a rack mechanism having an infinite number of teeth. In an actual strain wave gearing, the spline is provided with a limited number of teeth. However, in comparison with an ordinary gear, the spline is formed with a large number of teeth, for example, 160 teeth. Thus, as seen from the example of FIG. 4, the approximation is within an allowable range and of usable accuracy. Although previously it was difficult to obtain a profile of the tooth capable of maintaining the continuous contact, it should be appreciated that such a profile can now be easily formed, readily manufactured.

The profile of the tooth face obtained in the manner of FIG. 5 is preferable since continuous engagement is ensured over a wide range of the cup-shaped strain wave gearing. As a detailed explanation therefor is made in above-mentioned U.S. Pat. No. 4,823,638 Ser. No. 114,119, further explanation is omitted herein.

In the flat-shaped strain wave gearing, the above-mentioned tooth profile for the cup-shaped strain wave gearing can be applied to the engagement of the second circular spline 12 with the flexspline 13 because the engagement is identical with that of the circular spline and the flexspline of the cup-shaped strain wave gearing. However, as the number of teeth of the first circular spline 11 is equal to that of the flexspline 13, the splines do not rotate relative to each other so that one of the teeth of the flexspline 13 moves only within one of the spaces of the first circular spline 11 unlike the relationship between the second circular spline 12 and the flexspline 13. Thus, the idea above-mentioned U.S. Pat. No. 4,823,638 cannot be applied to the engagement of the first circular spline 11 and flexspline 13.

In the present invention, as the engagement of the second circular spline 12 and the flexspline 13 corresponds to that of the circular spline and the flexspline of the cup-shaped strain wave gearing, the flexspline 13 has the tooth profile of the flexspline of the copending application (namely, the flexspline 13 having the tooth face of a convex configuration and the tooth flank of a concave configuration), and, based on this relationship, the first circular spline 11 is formed with a specific tooth profile of such tooth depth and curve that the flexspline 13 is also engaged with the second circular spline 11 over a broad region of engagement.

To this end, in the present invention, the tooth profile of the first circular spline 11 is formed with such a configuration that the first circular spline 11 is engaged with the flexspline 13 over a predetermined range of intersection so far as the crest of the flexspline 13 deformed into the ellipsoid by means of the wave generator 14 intersects the crest circle of the first circular spline 11. In order to obtain the tooth profile of the first circular spline 11, the tooth profile of the flexspline 13 is correlated with such a locus that the tooth of the flexspline 13 moves within the space of the first circular spline 11 in accordance with the rotation of the wave generator 14.

Figure 6:
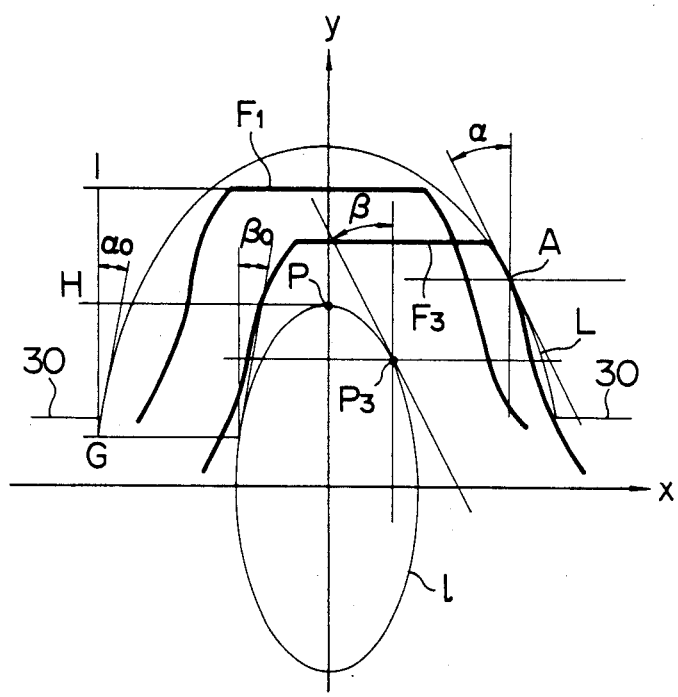
FIG. 6 is an illustrative graph showing a curve for producing a tooth profile of the first circular spline of the flat-shaped strain wave gearing in accordance with the present invention.
Figure 7:
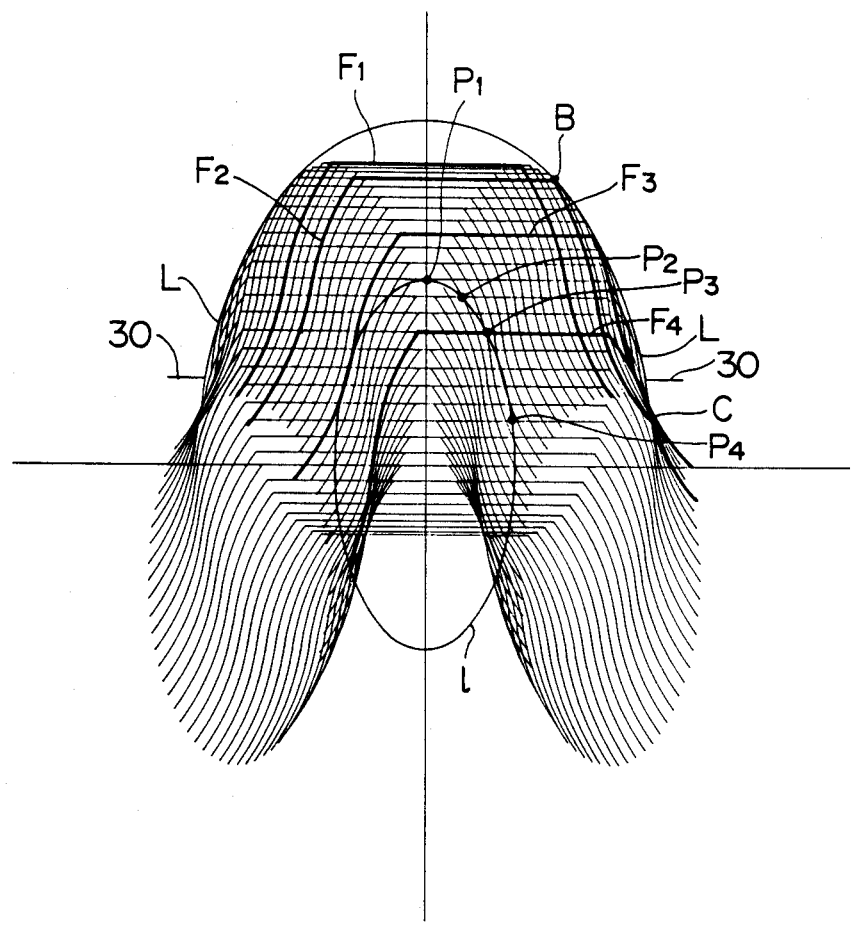
FIG. 7 is an ilustrative graph showing curves of a movement locus of the flexspline in the first circular spline of the flat-shaped strain wave gearing according to the present invention.

Since the number of teeth of the first circular spline 11 is equal to that of the flexspline 13, the two splines do not rotate relative to each other, and in the engagement region of the splines, one tooth of the flexspline 13 moves only in one space of the first circular spline 11. FIGS. 6 and 7 show that one tooth of the flexspline 13 moves in one space of the first circular spline 11 according to the rotation of the wave generator 14.

In FIG. 6, the elliptic line l shows a locus of a typical moving point of the flexspline 13 of which configuration is rotated by an elliptic wave generator 14, the typical moving point being at the center point P (i.e. the pitch point P) of the tooth height on the center line of the tooth of the flexspline. FIG. 7 shows selected positions of the tooth of the flexsplines 13 when the tooth of the flexspline is moved along the movement locus l of FIG. 6 as it stands in its orientation of posture. More specifically, FIG. 7 shows each position of the flexspline 13 when the same is rotated by 3 degrees. In FIG. 7, when the pitch point P of the flexspline 13 is moved from $P_1$ to $P_4$ along the movement locus l, the tooth of the flexspline 13 is transferred from $F_1$ to $F_4$. The movement produces a locus or curve L which is in contact with the tooth face of the flexspline. The curve L is a curve for producing a tooth profile of the first circular spline 11. In FIG. 6, the vertical height GI shows the working depth of the tooth of the first circular spline 11. The generated tooth profile L and the working depth GI are further described with reference to FIGS. 6 and 7.

In FIG. 6, the pitch point P of the flexspline 13 moves along the movement locus ( which is expressed by the following formulas.

$$x = \tfrac{1}{2} m \cdot \sin 2\theta \qquad (1)$$

$$y = m \cdot \cos 2\theta \qquad (2)$$

Wherein, as shown in FIG. 6, x is a coordinate normal to the center line of the space of the first circular spline 11, and y is a coordinate along the center line as mentioned above. m is a module of the tooth, and $\theta$ is an angle of rotation of the wave generator 14.

From the formulas, the following formula is derived to obtain an angle $\beta$ between the axis parallel to y-axis and the tangential line of the movement locus at the point P ($P_3$).

$$\tan\beta = -\frac{dx}{dy} = -\frac{\frac{dx}{d\theta}}{\frac{dy}{d\theta}} = 1/2 \cdot \cot 2\theta \qquad (3)$$

Meanwhile, the point A on the convex profile of the tooth face of the flexspline 13 is brought into contact with the space of the first circular spline 11 with a pressure angle $\alpha$. If the pressure angle $\alpha$ is equal to the angle $\beta$, the point A on the convex tooth profile of the flexspline 13 is in contact with the curve L when the pitch point P of the flexspline 13 moves along the movement locus l. In other words, the curve L is identical with the locus of the point A on the convex tooth face of the flexspline 13 having the same angle $\alpha$ as the angle $\beta$. Thus, if the curve L is applied to the first circular spline 11 as its generated tooth profile, the flexspline 13 comes into engagement with the first circular spline 11 over a larger region. Accordingly, the curve L shows the tooth profile to be applied to the first circular spline 11 so that the flexspline 13 is engaged with the spline 11 over a larger engagement region, and the curve L is very easily obtained. As shown in FIGS. 6 and 7 and appearing in the formula (3), the curve L gives the first circular spline 11 a dome-shaped concave tooth profile. Thus, the first circular spline 11 is provided with a concave tooth profile over the whole of the space thereof, but does not have the concave and convex tooth profile as seen in the profile of the flexspline.

Consideration will now be given to the tooth depth of the first circular spline 11. An appropriate depth of the spline 11 ensures the engagement with the convex tooth profile of the tooth face of the flexspline 13 over the larger engagement region. The concave tooth profile of the first circular spline 11 must be so shaped that it effectively engages with the convex tooth profile of the tooth face of the flexspline 11. With respect to the range of possible depths of the first circular spline 11, the lowest point thereof is at a point C on the curve L in FIG. 7. The flexspline 13 reaches the highest position at the point I in FIG. 6. As mentioned above, the distance between the lowest and highest points is shown as the vertical height GI, which is the longest distance as used for the depth of the first circular spline 11 in the present invention. The bottom of the space of the first circular spline 11 is provided with a groove or free space to provide play for the tooth of the flexspline 13 in the upper portion higher than the point I of FIG. 6. Thus, when the flexspline 13 is at the uppermost portion, the tooth at the top of the flexspline is disengaged from the surface of the space of the first circular spline 11. As the flexspline 13 moves down slightly (by rotating the wave generator 14 by approximately 9 degrees in this embodiment), the splines 11 and 13 again engage with each other. The engagement point is shown as the point B in FIG. 7. The curved line between the points B and C is used for the generated tooth profile L so that the flexspline 13 can be brought into continuous engagement with the first circular spline 11.

As discussed above, the maximum possible depth of the first circular spline 11 is the vertical height GI (as shown in FIG. 6). Provided that a point H is defined by the intersection of the line GI with a line horizontally extending from the pitch point P of the movement locus l, the vertical height IH of the height GI is equal to an addendum of the tooth face (the convex profile portion) of the flexspline 13, and therefore is determined if the addendum of the flexspline 13 is defined. Another vertical height GH can be longer so far as the convex tooth face of the flexspline 13 effectively engages with the first circular spline 11. As the height GH is formed longer, the tooth depth of the first circular spline 11 can also be made longer, so that the flexspline 13 can be engaged with the first circular spline 11 over a wide region, continuously.

Now, consideration is given to the working depth of the flexspline 13 wherein ha* is the coefficient of the addendum of the flexspline 13. The working depth of the flexspline 13 is $2 \cdot ha^* \cdot m$. The vertical height IH is the addendum of the flexspline 13 ($= ha^* \cdot m$). The vertical height GH is equal to or more than ($\geq$) the addendum of the flexspline ($= ha^* \cdot m$). Thus, the vertical height GI is equal to or more than $2 \cdot ha^* \cdot m$ ($GI \geq 2 \cdot ha^* \cdot m$). It is, therefore, possible to make the working depth of the first circular spline 11 in a length of at least $2 \cdot ha^* \cdot m$.

Meanwhile, the flexspline 13 is formed with the convex tooth face and the concave tooth flank. As the pressure angle $\alpha_o$ at the junction (the pitch point P) between the face and the flank decreases, the extent of the engagement of the flexspline with the first circular spline expands. However, it is difficult or impossible to form a zero degree pressure angle $\alpha_o$ because some flank areas for a cutting tool are necessary to cut the tooth profile on the flexspline 13. In view of cutting the tooth profile of the flexspline, the pressure angle $\alpha_o$ is preferably formed to be several degrees.

The minimum pressure angle $\alpha$ at which the tooth of the flexspline 13 effectively engages with the tooth surface of the first circular spline 11 is the pressure angle at the point G, which is, in turn, the pressure angle at the pitch point. This pressure angle is equal to the minimum pressure angle $\alpha_o$ as mentioned above. The minimum pressure angle $\alpha_o$ is measured or calculated with reference to FIG. 6. As pointed out previously, the tooth profile of the first circular spline 11 is formed by the generated tooth profile L. Thus, the minimum pressure angle $\alpha_o$ is the pressure angle of the curve L of the first circular spline 11 at the point G, and the angle $\alpha_o$ is equal to an inclination angle $\beta$ at the intersection of the movement locus l with a line horizontally extending from the point G to the locus l, the angle $\beta$ being the minimum inclination angle $\beta_o$.

Where $\alpha_o = \beta_o$ is given in the formula or equation (3) and $y = (1 - ha^*) \cdot m$ is given in the formulas or equations (1) and (2), $$\theta = \tfrac{1}{2} \cdot [cos^{-1}(1 - ha^*)] \text{ is obtained.}$$

The obtained "$\theta$" is substituted for the angle $\theta$ in the formula (3) to obtain the minimum pressure angle $\alpha_o$ by which the vertical height GI is equal to or more than $2 \cdot ha^* \cdot m$. Thus, the following formula is obtained.

$$\alpha_o \leq tan^{-1}[0.5(cot(cos^{-1}(1-ha^*))] \tag{4}$$

Where the coefficient ha* of the addendum of the flexspline 13 is selected at a typical value (namely, the addendum is half of the working depth of the entire tooth of the flexspline), for example 0.625, the minimum pressure angle $\alpha_o$ becomes as follows $$\alpha_o \leq 11.43°$$

In general, a minimum pressure angle $\alpha_o$ of approximately 5 degrees is sufficient to cut a suitable tooth profile of the flexspline 13 by the cutting tool or bit. The value of 11.43 degrees is approximately equal to (a little more than) twice 5 degrees. Thus, it should be appreciated that the value of the angle $\alpha_o$ is very preferable to form the tooth profile of the cutting tool. In fact, where the minimum pressure angle $\alpha_o$ is selected to be 5 degrees, the vertical height GH is higher than a half of the working depth of the tooth of the flexspline (namely, $ha^* \cdot m$) in comparison with the case where the angle $\alpha_o$ is selected to be 11.43 degrees. This allows the vertical height GI to be made relatively longer than the length of $2 \, ha^* \cdot m$. Thus, it is ensured that the flexspline 13 engages with the first circular spline 11 over a long engagement region.

The working depth of the first circular spline 11 can be made in the vertical height between the points I and G in FIG. 6. However, it is preferable to make the depth short by, for example, the distance between the point G and the line 30. It is the reasons why this is effective for eliminating interaction between the tooth tips. In such case, the vertical height between the line 30 and the point H should be made in at least a length larger than ha*·m.

Although the above descriptions are made on such a strain wave gearing whereby the flexspline is engaged with the circular spline at two points, the present invention is not limited to such a strain wave gearing. For example, the present invetion can be applied to another strain wave gearing in which the difference between the teeth of both splines is 3n and the splines are engaged with each other at three points, and can be further applied to similar gearings.

Figure 8:
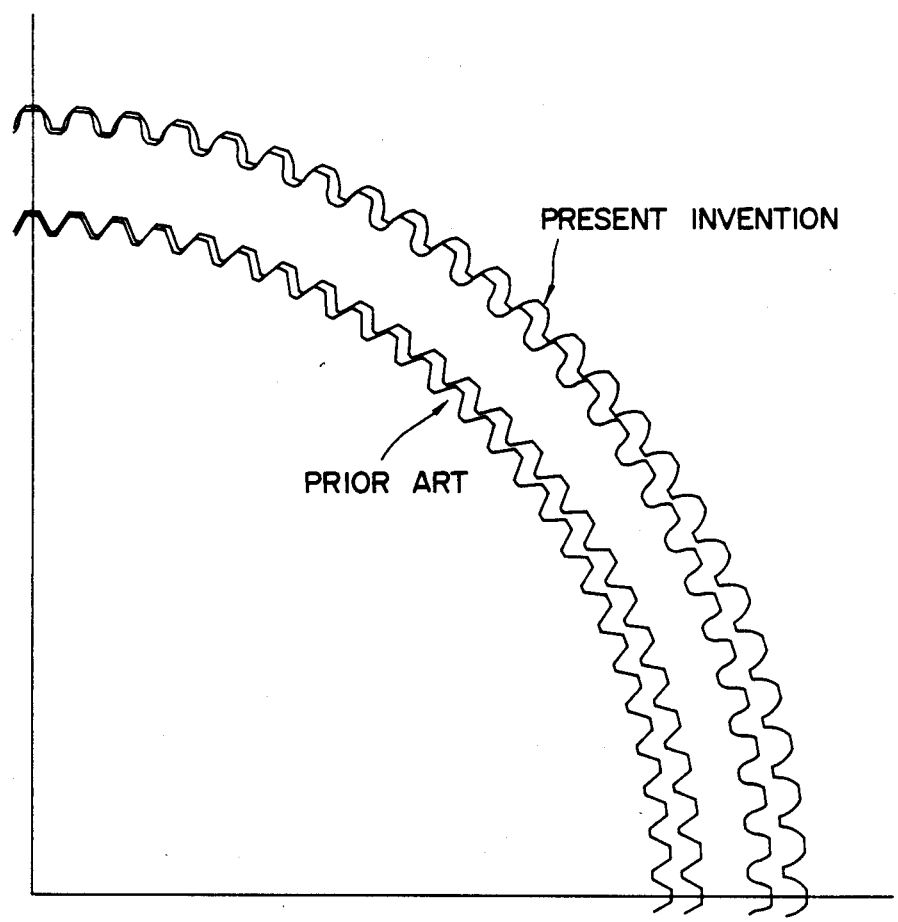
FIG. 8 illustrates a comparison of the engagement of the continuous contact type tooth profile between the flexspline and the first circular spline of the flat-shaped strain wave gearing of the present invention with that of the conventional strain wave gearing.
Figure 9:
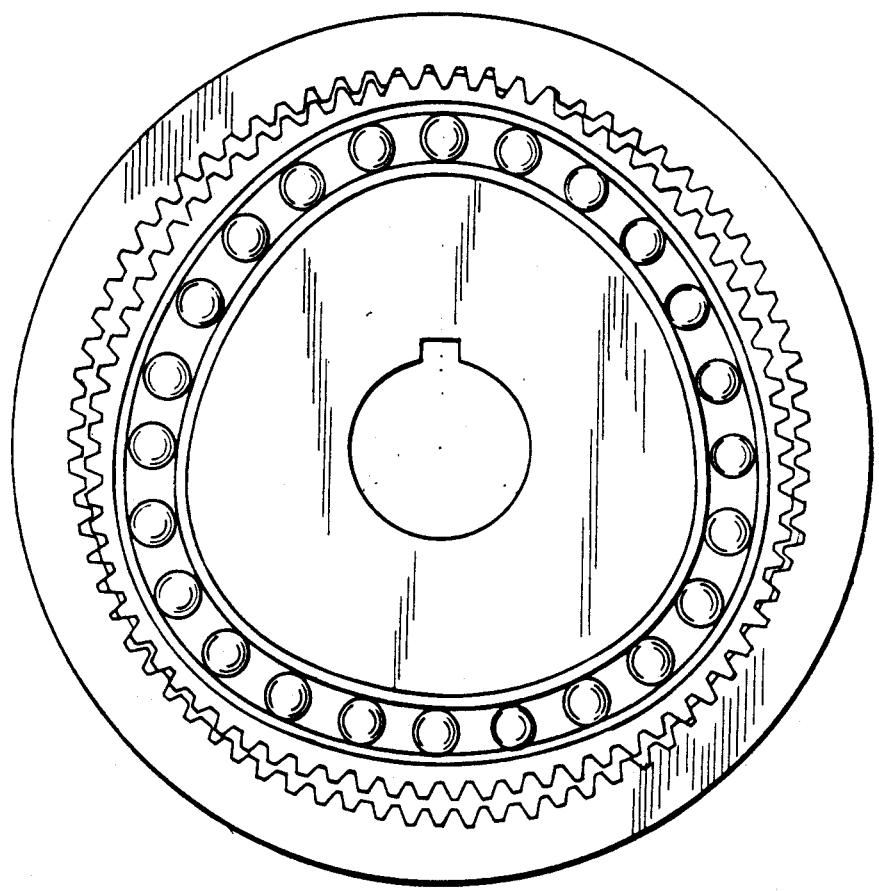

In accordance with the present invention, it is ensured that the flexspline is brought in continuous engagement with not only the second circular spline but also the first circular spline over their wide engagement regions, so that the high capacity of torque transfer is maintained. This is shown in FIG. 8. In FIG. 8, it should be appreciated that the conventional tooth profile causes the flexspline to engage with first circular spline over a shorter extent of the engagement region, but the tooth profile of the present invention makes the engagement region of the two splines longer or wider.

As discussed previously, the specific tooth profile of the first circular spline can be easily obtained according to the present invention and a cost for making the spline can also be maintained lowered. It is advantageous in that the pressure angle of the flexspline must not be formed so smaller even though the working depth of the first circular spline is more than the double of the addendum of the flexspline. Thus, the tooth profile of the flexspline can be formed by means of a conventional cutting tool or process without any specific cutting edge.

The invention has thus been shown and described with reference to specific embodiments, however, it should be noted that the invention is not limited to the details of the illustrated structures but changes and modifications may be made without departing from the scope of the appended claims.

We claim:

1. A strain wave gearing comprising a first rigid circular spline, a second rigid circular spline juxtaposed with the first spline along the axis of the first spline and having a different number of teeth from that of the first spline, a flexspline disposed coaxially inside both circular splines and having the same number of teeth as the first circular spline, and a wave generator having a non-circular configuration for deforming the flexspline into said non-circular configuration to bring the flexspline into partial engagement with the teeth of each of the first and second circular splines and for rotating the deformed configuration of the flexspline to produce a relative rotation between the first and second circular splines, and each of said second circular spline and the flexspline having a tooth profile formed based on a mapping curve which is a similar figure of a reduced scale of one-half applied to a first locus curve of the flexspline movement relative to the second circular spline in accordance with said configuration of the wave generator, with the similar figure being based on a reference point where the second circular spline and the flexspline are transferred from a contact state to a disengagement state from each other so as to provide each tooth of the flexspline with a convex tooth face and a concave tooth flank, wherein the tooth profile of the first circular spline other than a free space at the bottom of the tooth is given by a second locus curve that the tooth face of one tooth of the flexspline plots in one tooth space of the first circular spline when the deformed configuration of the flexspline is rotated by the wave generator, and the tooth depth of the first circular spline is made equal to or larger than the working depth of the flexspline.

2. The strain wave gearing of claim 1 wherein the wave generator configuration is elliptical, and the flexspline is deformed into an elliptic configuration to bring the teeth of the flexspline into engagement with those of the circular spline at two points on the major axis of an ellipsoid.

3. The strain wave gearing of claim 1 wherein the flexspline is deformed to bring the flexspline into engagement with the circular spline at substantially three points equally spaced.

* * * * *